United States Patent
Tian et al.

(10) Patent No.: US 10,149,284 B2
(45) Date of Patent: Dec. 4, 2018

(54) SYSTEMS AND METHODS FOR GROUP BLOCK ACKNOWLEDGMENT TRANSMISSIONS

(71) Applicant: QUALCOMM Incorporated, San Diego, CA (US)

(72) Inventors: Bin Tian, San Diego, CA (US); Simone Merlin, San Diego, CA (US); Alfred Asterjadhi, San Diego, CA (US); George Cherian, San Diego, CA (US); Gang Ding, San Diego, CA (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 15/013,804

(22) Filed: Feb. 2, 2016

(65) Prior Publication Data

US 2016/0234831 A1    Aug. 11, 2016

Related U.S. Application Data

(60) Provisional application No. 62/112,570, filed on Feb. 5, 2015.

(51) Int. Cl.
*H04W 72/04*    (2009.01)
*H04L 1/16*    (2006.01)
(Continued)

(52) U.S. Cl.
CPC ....... *H04W 72/0413* (2013.01); *H04L 1/1621* (2013.01); *H04L 1/1861* (2013.01);
(Continued)

(58) Field of Classification Search
CPC ... H04L 1/1621; H04L 1/1685; H04L 1/1861; H04L 1/1864; H04L 1/1896;
(Continued)

(56) References Cited

U.S. PATENT DOCUMENTS

| | | | | |
|---|---|---|---|---|
| 2011/0090855 A1* | 4/2011 | Kim | ...................... | H04B 7/0452 370/329 |
| 2013/0329626 A1* | 12/2013 | Sohn, III | ............. | H04B 7/0452 370/312 |

(Continued)

OTHER PUBLICATIONS

International Search Report and Written Opinion—PCT/US2016/016389—ISA/EPO—dated May 27, 2016.

*Primary Examiner* — Awet Haile
(74) *Attorney, Agent, or Firm* — Knobbe, Martens, Olson & Bear, LLP

(57) ABSTRACT

Methods and apparatus for allocating multi-user resources are provided. In one aspect, the disclosure provides for a method of wireless communication with a plurality of wireless stations. The method comprises transmitting, by an access point, a first communication to a first wireless station, the first communication comprising an indication of a group of wireless stations from among the plurality of wireless stations, the group of wireless stations comprising the first wireless station. The method further comprises receiving, by the access point, a second communication from the first wireless station. The method further comprises transmitting, by the access point, a third communication to the group of wireless stations, the third communication comprising data for the group of wireless stations. In certain aspects, the third communication comprises a block acknowledgment of at least a portion of the second communication.

20 Claims, 11 Drawing Sheets

(51) Int. Cl.
*H04L 1/18* (2006.01)
*H04W 72/12* (2009.01)
*H04L 1/00* (2006.01)

(52) U.S. Cl.
CPC .......... *H04L 1/1864* (2013.01); *H04L 1/1896* (2013.01); *H04W 72/0426* (2013.01); *H04W 72/0446* (2013.01); *H04W 72/121* (2013.01); *H04L 1/1685* (2013.01); *H04L 2001/0093* (2013.01)

(58) Field of Classification Search
CPC ...... H04L 2001/0093; H04W 72/0413; H04W 72/0426; H04W 72/0446; H04W 72/121
See application file for complete search history.

(56) References Cited

U.S. PATENT DOCUMENTS

| | | |
|---|---|---|
| 2014/0133408 A1 | 5/2014 | Wentink |
| 2014/0192742 A1 | 7/2014 | Gong et al. |
| 2014/0314004 A1 | 10/2014 | Zhou et al. |
| 2015/0009879 A1* | 1/2015 | Kim ...................... H04W 74/06 370/311 |
| 2017/0005709 A1* | 1/2017 | Li ........................ H04B 7/0452 |

* cited by examiner

SYSTEMS AND METHODS FOR GROUP BLOCK ACKNOWLEDGMENT TRANSMISSIONS

CROSS REFERENCE TO PRIORITY APPLICATION

This application claims priority under 35 U.S.C. § 119(e) to U.S. Provisional Pat. App. 62/112,570 entitled "SYSTEMS AND METHODS FOR GROUP BLOCK ACKNOWLEDGMENT TRANSMISSIONS" filed on Feb. 5, 2015, the disclosure of which is hereby incorporated by reference in its entirety.

BACKGROUND

Field

Certain aspects of the present disclosure generally relate to wireless communications, and more particularly, to methods and apparatuses for bandwidth allocation in multiple user uplink communication in a wireless network.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple wireless stations to communicate with a single access point by sharing the channel resources while achieving high data throughputs. With limited communication resources, it is desirable to reduce the amount of traffic passing between the access point and the multiple terminals. For example, when multiple terminals send uplink communications to the access point and when the access point sends downlink communications to the multiple terminals, it is desirable to minimize the amount of traffic to complete the uplink and downlink of all transmissions. Thus, there is a need for an improved protocol for uplink transmissions from multiple terminals and for downlink transmissions to multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of wireless communication with a plurality of wireless stations. The method comprises transmitting, by an access point, a first communication to a first wireless station, the first communication comprising an indication of a group of wireless stations from among the plurality of wireless stations, the group of wireless stations comprising the first wireless station. The method further comprises receiving, by the access point, a second communication from the first wireless station. The method further comprises transmitting, by the access point, a third communication to the group of wireless stations, the third communication comprising data for the group of wireless stations.

Another aspect of the disclosure provides an access point for wireless communication with a plurality of wireless stations. The access point comprises a processor, the processor configured to generate a first communication comprising an indication of a group of wireless stations from among the plurality of wireless stations. The access point further comprises a transmitter, the transmitter configured to transmit the first communication to a first wireless station of the group of wireless stations. The access point further comprises a receiver, the receiver configured to receive a second communication from the first wireless station. The processor is further configured to generate a third communication comprising data for the group of wireless stations, and the transmitter is further configured to transmit the third communication to the group of wireless stations.

Another aspect of the disclosure provides a non-transitory computer readable medium storing instructions that when executed cause a processor to perform a method of wireless communication with a plurality of wireless stations. The medium comprises instructions that when executed cause a processor to perform a step of transmitting, by an access point, a first communication to a first wireless station, the first communication comprising an indication of a group of wireless stations from among the plurality of wireless stations, the group of wireless stations comprising the first wireless station. The medium comprises instructions that when executed cause a processor to perform a step of receiving, by the access point, a second communication from the first wireless station. The medium comprises instructions that when executed cause a processor to perform a step of transmitting, by the access point, a third communication to the group of wireless stations, the third communication comprising data for the group of wireless stations.

Another aspect of the disclosure provides an access point for wireless communication with a plurality of wireless stations. The access point comprises means generating a first communication comprising an indication of a group of wireless stations from among the plurality of wireless stations. The access point further comprises means for transmitting the first communication to a first wireless station of the group of wireless stations. The access point further comprises mean for receiving a second communication from the first wireless station. The access point further comprises means for generating a third communication comprising data for the group of wireless stations. The access point further comprises means for transmitting the third communication to the group of wireless stations.

DETAILED DESCRIPTION

Figure 1:
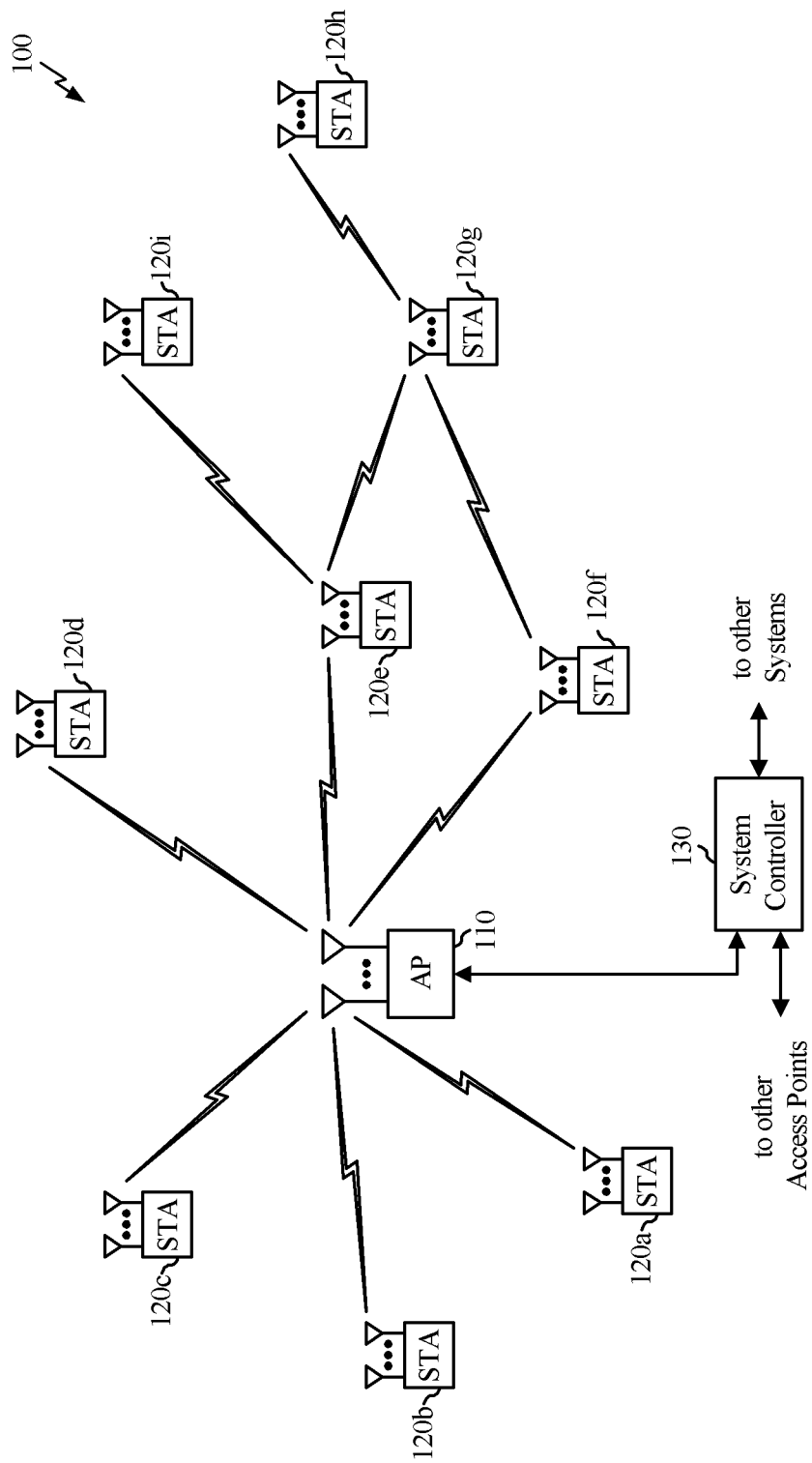
FIG. 1 illustrates a multiple-access multiple-input multiple-output (MIMO) system with access points and wireless stations.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLAN). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may be used to transmit wireless signals across short distances, may be able to transmit signals less likely to be blocked by objects, such as humans, may allow for increased peer-to-peer services (e.g., Miracast, WiFi Direct Services, Social WiFi, etc.) in the same area, may support increased per-user minimum throughput requirements, supporting more users, may provide improved outdoor coverage and robustness, and/or may consume less power than devices implementing other wireless protocols.

In some implementations, a WLAN includes various devices which are the components that access the wireless network. For example, there may be two types of devices: access points (APs) and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple wireless stations. A TDMA system may allow multiple wireless stations to share the same frequency channel by dividing the transmission signal into different time slots, each time slot being assigned to different wireless station. A TDMA system may implement Global System for Mobile Communications (GSM) or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each subcarrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point (AP) may comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

A station (STA) may also comprise, be implemented as, or known as a user terminal ("UT"), an access terminal (AT), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with access points and STAs 120a-i (referred to herein as "STAs 120" or individually as "STA 120"). For simplicity, only one AP 110 is shown in FIG. 1. An AP 110 is generally a fixed station that communicates with the STAs 120 and may also be referred to as a base station or using some other terminology. In some implementations, the AP 110 may be a mobile station. A STA 120 may be fixed or mobile and may also be referred to as a wireless station, a mobile station, or a wireless device, or using some other terminology. The AP 110 may communicate with one or more STAs 120 at any given moment on the downlink and uplink. The downlink (DL) (e.g., forward link) is the communication link from the AP 110 to the STAs 120, and the uplink (UL) (e.g., reverse link) is the communication link from the STAs 120 to the AP 110. A STA 120 may also communicate peer-to-peer with another STA 120. A system controller 130 couples to and provides coordination and control for the APs 110.

While portions of the following disclosure will describe STAs 120 capable of communicating via Spatial Division Multiple Access (SDMA), for certain aspects, the STAs 120 may also include some STAs that do not support SDMA. Thus, for such aspects, the AP 110 may be configured to communicate with both SDMA and non-SDMA STAs 120. This approach may conveniently allow older versions of STAs ("legacy" STAs 120) that do not support SDMA to remain deployed in an enterprise, extending their useful lifetime, while allowing newer SDMA STAs 120 to be introduced as deemed appropriate.

The system 100 employs multiple transmit and multiple receive antennas for data transmission on the downlink and uplink. The AP 110 is equipped with $N_{ap}$ antennas and represents the multiple-input (MI) for downlink transmissions and the multiple-output (MO) for uplink transmissions. A set of K selected STAs 120 collectively represents the multiple-output for downlink transmissions and the multiple-input for uplink transmissions. For pure SDMA, it is desired to have $N_{ap} \geq K \geq 1$ if the data symbol streams for the K STAs 120 are not multiplexed in code, frequency or time by some means. K may be greater than $N_{ap}$ if the data symbol streams can be multiplexed using TDMA technique, different code channels with code division multiple access (CDMA), disjoint sets of sub-bands with OFDM, and so on. Although not described in detail, several of the embodiments described herein may be implemented using CDMA. Each selected STA 120 may transmit user-specific data to and/or receive user-specific data from the AP 110. In general, each selected STA 120 may be equipped with one or multiple antennas (e.g., $N_{ut} \geq 1$). The K selected STAs 120 can have the same number of antennas, or one or more STAs 120 may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each STA 120 may be equipped with a single antenna (e.g., in order to keep costs down) or multiple antennas (e.g., where the additional cost can be supported). The system 100 may also be a TDMA system if the STAs 120 share the same frequency channel by dividing transmission/reception into different time slots, where each time slot may be assigned to a different STA 120.

Figure 2:
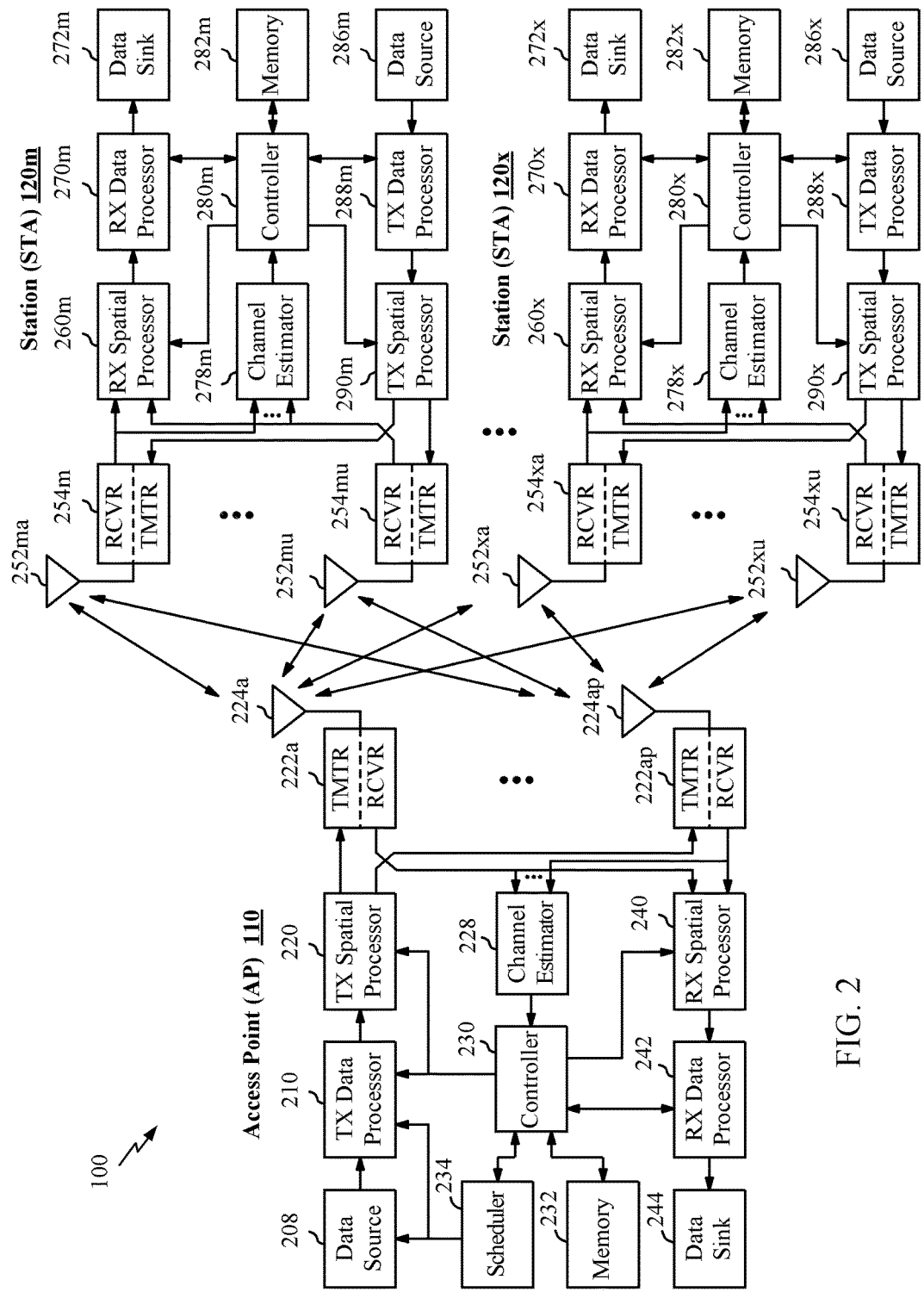
FIG. 2 illustrates a block diagram of the access point and two wireless stations of FIG. 1 in a MIMO system.

FIG. 2 illustrates a block diagram of the AP 110 and two STAs 120m and 120x in MIMO system 100. The AP 110 is equipped with $N_t$ antennas 224a through 224ap. The STA 120m is equipped with $N_{ut,m}$ antennas $252_{ma}$ through $252_{mu}$, and the STA 120x is equipped with $N_{ut,x}$ antennas $252_{xa}$ through $252_{xu}$. The AP 110 is a transmitting entity for the downlink and a receiving entity for the uplink. The STA 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ STAs 120 are selected for simultaneous transmission on the uplink, and $N_{dn}$ STAs 120 are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the AP 110 and/or the STA 120.

On the uplink, at each STA 120 selected for uplink transmission, a TX data processor 288 receives traffic data from a data source 286 and control data from a controller 280. The TX data processor 288 processes (e.g., encodes, interleaves, and modulates) the traffic data for the STA 120 based on the coding and modulation schemes associated with the rate selected for the STA 120 and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the AP 110.

$N_{up}$ STA 120 may be scheduled for simultaneous transmission on the uplink. Each of these STA 120 may perform spatial processing on its respective data symbol stream and transmit its respective set of transmit symbol streams on the uplink to the AP 110.

At the AP 110, $N_{up}$ antennas 224a through $224_{ap}$ receive the uplink signals from all $N_{up}$ STA 120 transmitting on the uplink. Each antenna 224 provides a received signal to a respective receiver unit (RCVR) 222. Each receiver unit 222 performs processing complementary to that performed by transmitter unit 254 and provides a received symbol stream. A receiver (RX) spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA 120. An RX data processor 242 processes (e.g., demodulates, deinterleaves, and decodes) each recovered uplink data symbol stream in accordance with the rate used for that stream to obtain decoded data. The decoded data for each STA 120 may be provided to a data sink 244 for storage and/or a controller 230 for further processing.

On the downlink, at the AP 110, a TX data processor 210 receives traffic data from a data source 208 for $N_{dn}$ STA 120 scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA 120 based on the rate selected for that STA 120. The TX data processor 210 provides $N_{dn}$ downlink data symbol streams for the $N_{dn}$ STA 120. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the STAs 120.

At each STA 120, $N_{ut,m}$ antennas 252 receive the $N_{up}$ downlink signals from the AP 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the STA 120.

At each STA 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each STA 120 typically derives the spatial filter matrix for the STA 120 based on the downlink channel response matrix $H_{dn,m}$ for that STA 120. Controller 230 derives the spatial filter matrix for the AP 110 based on the effective uplink channel response matrix $H_{up,eff}$. The controller 280 for each STA 120 may send feedback information (e.g., the downlink and/or uplink eigenvectors, eigenvalues, SNR estimates, and so on) to the AP 110. The controllers 230 and 280 may also control the operation of various processing units at the AP 110 and STA 120, respectively.

Figure 3:
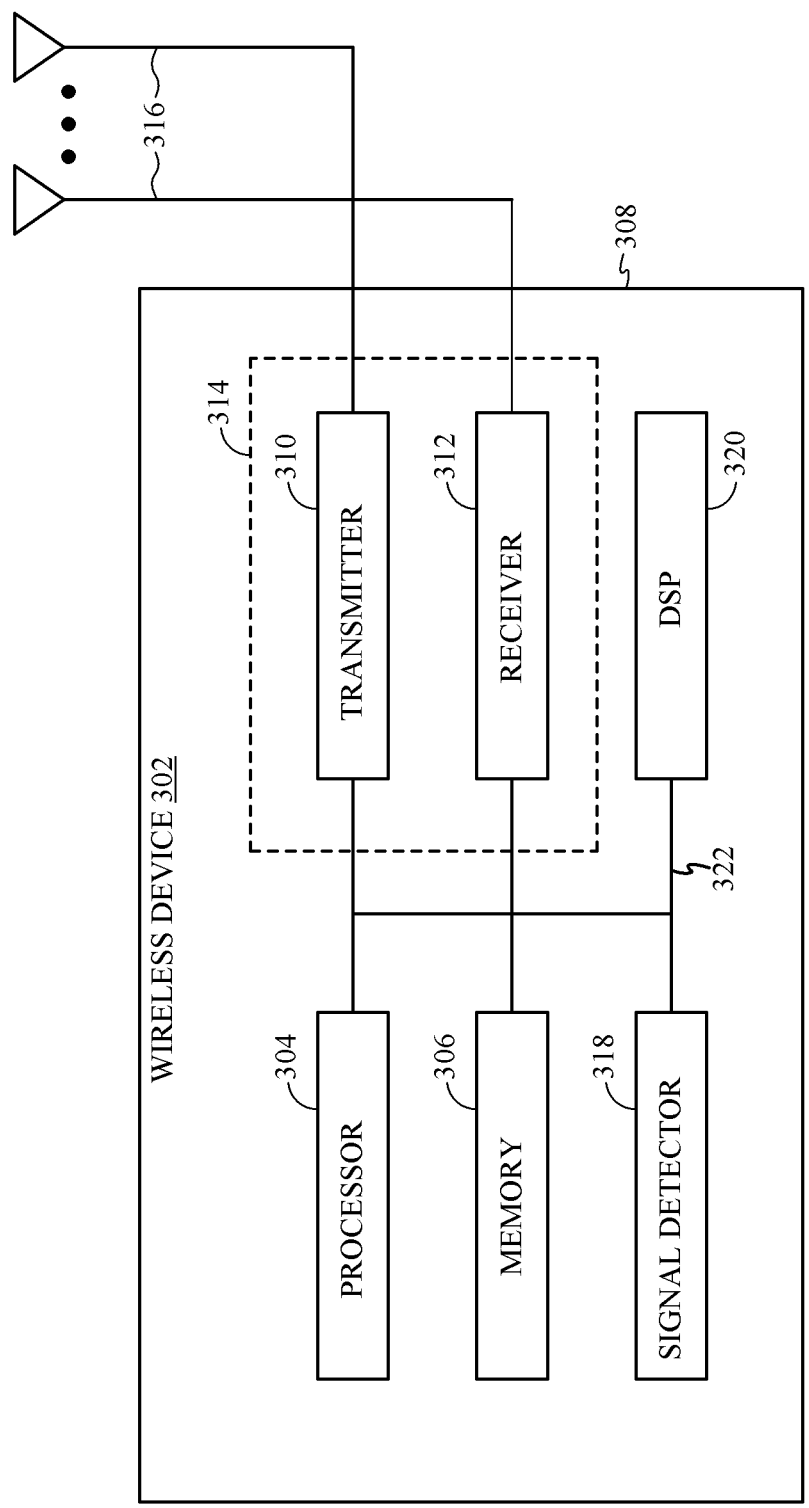
FIG. 3 illustrates various components that may be utilized in a wireless device that may be employed within a wireless communication system.

FIG. 3 illustrates various components that may be utilized in a wireless device 302 that may be employed within the wireless communication system 100. The wireless device 302 is an example of a device that may be configured to implement the various methods described herein. The wireless device 302 may implement an AP 110 or a STA 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
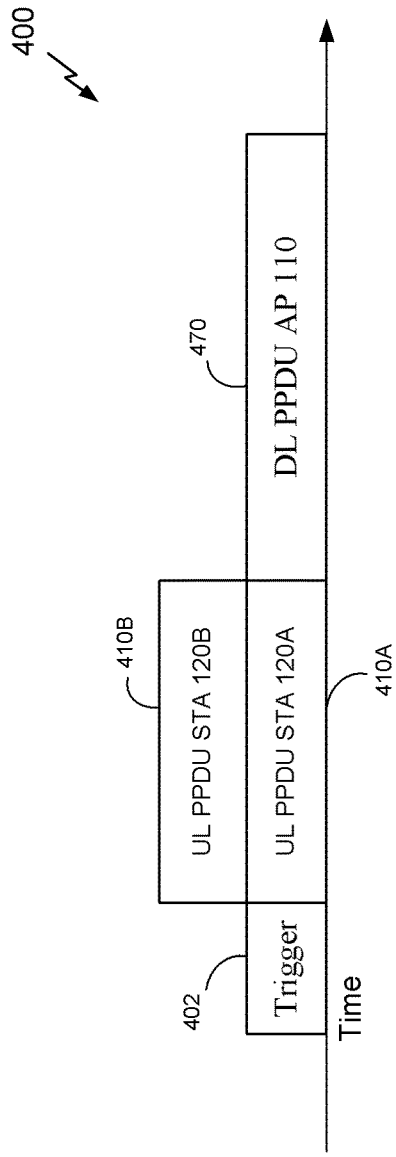
FIG. 4 shows a time diagram of an example frame exchange of a trigger message, an uplink PPDU transmission, and a downlink PPDU transmission.
Figure 5:
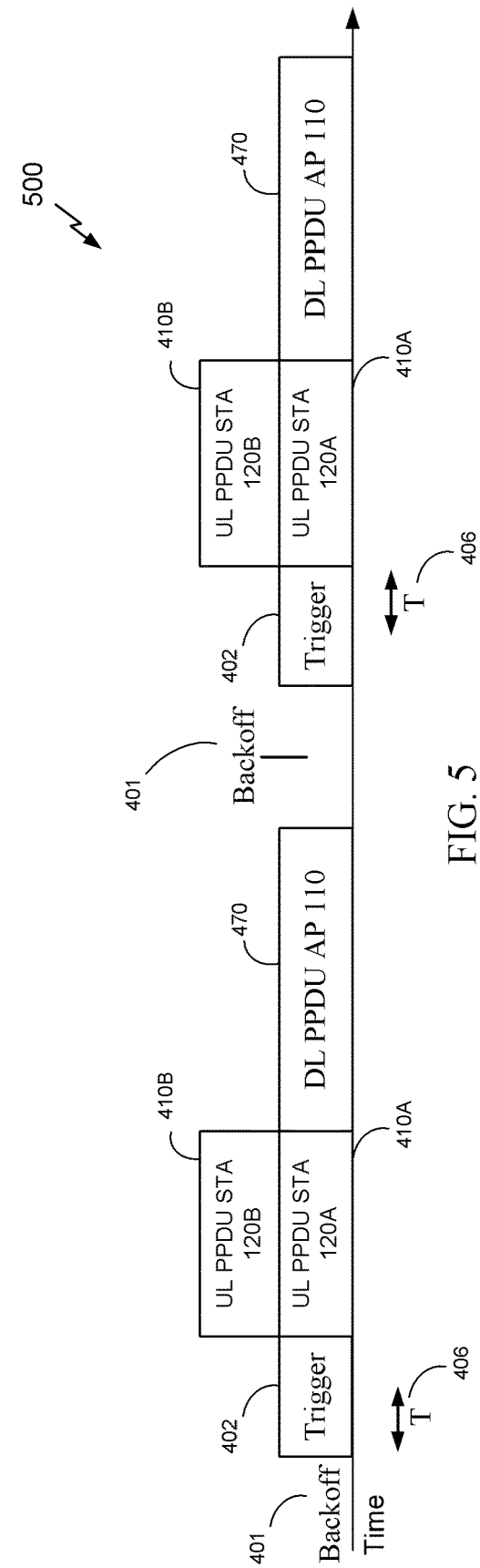
FIG. 5 shows a time diagram of another example frame exchange of a trigger message, an uplink PPDU transmission, and a downlink PPDU transmission.

Certain aspects of the present disclosure support transmitting a downlink (DL) signal from an AP to multiple STAs. In some embodiments, the DL signal may be transmitted in a multi-user MIMO (MU-MIMO) system. Alternatively, the DL signal may be transmitted in a multi-carrier FDMA (MC-FDMA) or similar FDMA system, such as a multi-carrier orthogonal FDMA (MC-OFDMA). Specifically, FIGS. 4-5, illustrate DL PPDU transmission 470, which may be sent by the AP in an MU-MIMO system or an MC-FDMA system. In some embodiments, UL-MU-MIMO or UL-FDMA transmissions are triggered by a frame sent by an AP and are initiated a short time after the frame. In some embodiments, the trigger message may be sent with regular channel access rules, including the dynamic selection of available BW depending on a clear channel assessment (CCA) on a secondary channel at the AP. The AP may define transmission channels and streams per each STA for the UL transmissions. UL-MU-MIMO or UL-FDMA transmissions can be sent simultaneously from multiple STAs to an AP and may create efficiencies in wireless communication. In some embodiments, DL-MU-MIMO or DL-FDMA transmissions are triggered by the UL-MU-MIMO or UL-FDMA transmission sent by the multiple STAs 120, and are initiated a short time after the transmission. In these embodiments, DL-MU-MIMO or DL-FDMA transmissions can be sent simultaneously from an AP to multiple STAs and may create efficiencies in wireless communication.

FIG. 4 shows a time diagram of an example frame exchange 400 of a trigger message, an uplink PPDU transmission, and a downlink PPDU transmission. As shown in FIG. 4 and in conjunction with FIG. 1, an AP 110 may transmit a trigger message 402 to the STAs or STAs 120 indicating which STAs may participate in the UL PPDU transmission exchange, such that a particular STA knows to start a UL PPDU transmission 410. A STA participating in the UL PPDU transmission exchange may request acknowledgment of receipt of at least a portion of the data contained in the UL PPDU transmission 410. The AP 110 may acknowledge receipt of the data through the use of a DL PPDU transmission 470 comprising multiple resources. However, the STA must know on what resource to decode in order to receive the acknowledgement intended for that STA. Accordingly, various embodiments are described herein that provide systems and methods of allocating resources to address the above described transmission exchange. In some embodiments, an indication of the resource is provided to the STA before the STA sends a transmission for which it requests acknowledgment. In other embodiments, the indication of the resource is provided after the STA sends the transmission for which it requests acknowledgment. In some embodiments, the indication of the resource is a group identifier, which identifies a group of STAs comprising the STA requesting acknowledgment. In some embodiments, the indication of the resource is a frequency bandwidth or spatial stream. In one embodiment, the trigger message 402 comprises a clear to transmit (CTX) message. An example of a trigger message or CTX message structure is described more fully below with reference to FIG. 6. The trigger message 402 may also be referred to as a trigger frame, and the CTX message may also be referred to as a CTX frame.

In some aspects, the trigger message 402 may comprise a group identifier for a group of STAs 120 or user devices, which may comprise the STA transmitting the UL PPDU transmission 410. For example, the trigger message 402 may comprise a group identifier for a group of STAs which may also comprise STA 120A transmitting UL PPDU transmission 410A. In some embodiments, the UL PPDU may comprise data in accordance with an UL-MU-MIMO scheme. In other embodiments, the UL PPDU may comprise data in accordance with an UL-FDMA scheme. In some embodiments, the trigger message 402 comprises an indication of a frequency bandwidth or spatial stream on which a STA is to transmit the UL PPDU transmission 410A-B. For example, the trigger message 402 may comprise an indication of the frequency bandwidth on which STA 120A is to transmit UL PPDU transmission 410A.

Once a STA 120 receives a trigger message 402 from the AP 110 where the STA is listed, the STA 120 may transmit the UL PPDU transmission 410A-B. In FIG. 4, STA 120A and STA 120B transmit UL PPDU transmission 410A and 410B containing physical layer convergence protocol (PLCP) protocol data units (PPDUs). In FIG. 4, upon receiving the UL PPDU transmission 410A-B, the AP 110 transmits DL PPDU transmission 470 to the STAs 120. In some embodiments, the DL PPDU transmission 470 may comprise data in accordance with a DL-MU-MIMO scheme. In other embodiments, the DL PPDU transmission 470 may comprise data in accordance with a DL-FDMA scheme. In some embodiments, the trigger message 402 comprises an indication of a group of STAs to receive the DL PPDU transmission 470. For example, the trigger message 402 may comprise a group identifier for a group of STAs comprising STA 120A and STA 120B that is to receive a resource or data located within a DL-FDMA (or DL-MU-MIMO) transmission. In accordance with these embodiments, DL PPDU transmission 470 may comprise a preamble indicating a frequency bandwidth or spatial stream on which a STA or group of STAs are to receive the resource or data.

In other embodiments, the trigger message 402 comprises an indication of a frequency bandwidth or spatial stream on which a STA or group of STAs are to receive the DL PPDU transmission 470. For example, the trigger message 402 may comprise an indication of the frequency bandwidth on which a group of STAs comprising STA 120A and STA 120B is to receive a DL-FDMA (or DL-MU-MIMO) transmission. In one embodiment, DL PPDU transmission 470 comprises one or more acknowledgment (ACK) or block acknowledgment (BA) messages for the STAs 120. In some embodiments, DL PPDU transmission 470 comprises management data or control data for the STAs 120.

Not all APs or STAs 120 may support UL-MU-MIMO or UL-FDMA operation. A capability indication from a STA 120 may be indicated in a high efficiency wireless (HEW) capability element that is included in an association request or probe request and may include a bit indicating capability, the maximum number of spatial streams a STA 120 can use in a UL-MU-MIMO transmission, the frequencies a STA 120 can use in a UL-FDMA transmission, the minimum and maximum power and granularity in the power backoff, and the minimum and maximum time adjustment a STA 120 can perform.

A capability indication from an AP 110 may be indicated in a HEW capability element that is included in an association response, beacon or probe response and may include a bit indicating capability, the maximum number of spatial streams a single STA 120 can use in a UL-MU-MIMO transmission, the frequencies a single STA 120 can use in a UL-FDMA transmission, the required power control granularity, and the required minimum and maximum time adjustment a STA 120 should be able to perform.

In one embodiment, capable STAs 120 may request to a capable AP to be part of the UL-MU-MIMO and DL-MU-MIMO (or UL-FDMA and DL-FDMA) protocol by sending a management frame to AP indicating request for enablement of the use of UL-MU-MIMO or DL-MU-MIMO feature (or UL-FDMA or DL-FDMA). In one aspect, an AP 110 may respond by granting the use of the MU-MIMO (or FDMA) features or denying them. Once the use of the UL-MU-MIMO (or UL-FDMA) is granted, the STA 120 may expect a trigger message 402 at a variety of times. Additionally, once a STA 120 is enabled to operate the UL-MU-MIMO (or UL-FDMA) feature, the STA 120 may be subject to follow a certain operation mode. If multiple operation modes are possible, an AP may indicate to the STA 120 which mode to use in a HEW capability element or in an operation element. In one aspect the STAs 120 can change the operation modes and parameters dynamically during operation by sending a different operating element to the AP 110. In another aspect the AP 110 may switch operation modes dynamically during operation by sending an updated operating element to a STA 120 or in a beacon. In another aspect, the operation modes may be indicated in the setup phase and may be setup per STA 120 or for a group of STAs 120. In another aspect the operation mode may be specified per traffic identifier (TID).

FIG. 5 shows a time diagram of another example frame exchange 500 of a trigger message, an uplink PPDU transmission, and a downlink PPDU transmission. In this embodiment, a STA 120 receives a trigger message 402 from an AP 110. The UL PPDU transmission 410A and 410B are then sent by the STAs 120A and 120B to the AP 110. The AP 110 may then send a DL PPDU transmission 470 to the STAs 120A and 120B. In some aspects, the DL PPDU transmission 470 may comprise ACK signals. In one embodiment, the ACK signals may be serial ACK signals to each STA 120 or BAs. In some aspects the ACKs may be polled. This embodiment creates efficiencies by simultaneously transmitting ACK signals from an AP 110 to groups of STAs instead of sequentially, which saves time and reduces overhead in communications. After transmission of the DL PPDU transmission 470, AP 110 may not transmit another trigger message until a backoff period 401 has passed.

In some embodiments, STAs 120A and 120B receive a trigger message 402 from an AP 110 and are allowed to start and UL PPDU transmission a time (T) 406 after the end of the PPDU carrying the trigger message 402. The T 406 may be a short interframe space (SIFS), point interframe space (PIFS), or another time potentially adjusted with additional offsets as indicated by an AP 110 in the trigger message 402 or via a management frame. The SIFS and PIFS time may be fixed in a standard or indicated by an AP 110 in the trigger message 402 or in a management frame. The benefit of T 406 may be to improve synchronization or to allow STAs 120A and 120B time to process the trigger message 402 or other messages before transmission.

In some embodiments, a STA 120 may have data to upload to the AP but the STA 120 has not received a trigger message 402 or other signal indicating that the STA 120 may start a UL PPDU transmission.

In one operation mode, the STAs 120 may not transmit outside an UL PPDU transmission opportunity (TXOP) (e.g., after trigger message 402). In another operation mode, STAs 120 may transmit frames to initialize a UL PPDU transmission, and then may transmit during the UL PPDU TXOP, if for example, they are instructed to do so in a trigger message 402. The frequency bandwidth or spatial stream on which the STA 120 is to transmit the UL PPDU transmission 410A-B may be indicated in the trigger message 402. In one embodiment, the frame to initialize a UL PPDU transmission 410A-B may be a request to transmit (RTX), or another frame specifically designed for this purpose. The RTX frames may be the only frames a STA 120 is allowed to use to initiate a UL PPDU TXOP. In one embodiment, the STA 120 may not transmit outside an UL PPDU TXOP other than by sending an RTX. In another embodiment, a frame to initialize an UL PPDU transmission 410A-B may be any frame which indicates to an AP 110 that a STA 120 has data to send. It may be pre-negotiated that these frames indicate a UL PPDU TXOP request. For example, the following may be used to indicate that a STA 120 has data to send and is requesting an UL PPDU TXOP: a request to send (RTS), a data frame or quality of service (QoS) Null frame with bits 8-15 of the QoS control frame set to indicate more data, or a power save (PS) poll.

In one embodiment, the STA 120 may not transmit outside an UL PPDU TXOP other than by sending frames to trigger this TXOP, where this frame may be an RTS, PS poll, or QOS null. In another embodiment, the STA 120 may send single user uplink data as usual, and may indicate a request for a UL PPDU TXOP by setting bits in the QoS control frame of its data packet. In another operation mode, STAs 120 may transmit requests for UL PPDU transmissions 410A-B in accordance with regular contention protocol. In another aspect, the contention parameters for STAs 120 using UL PPDU are set to a different value than for other STAs that are not using the UL-MU-MIMO (or UL-FDMA) feature. In this embodiment, the AP 110 may indicate the value of the contention parameters in a beacon, association response or through a management frame. In another aspect, the AP 110 may provide a delay timer that prevents a STA 120 from transmitting for a certain amount of time after each successful UL PPDU TXOP or after each RTX, RTS, PS-poll, or QoS null frame. The timer may be restarted after each successful UL PPDU TXOP. In one aspect, the AP 110 may indicate the delay timer to STAs 120 in the setup phase or the delay timer may be different for each STA 120. In another aspect, the AP 110 may indicate the delay timer in the trigger message 402 or the delay timer may be dependent on the order of the STAs 120 in the trigger message 402, and may be different for each terminal.

In another operational mode, the AP 110 may indicate a time interval during which the STAs 120 are allowed to transmit a UL PPDU transmission. In one aspect, the AP 110 indicates a time interval to the STAs 120 during which the STAs 120 are allowed to send a RTX or RTS or other request to the AP 110 to ask for an UL PPDU transmission. In this aspect, the STAs 120 may use regular contention protocol. In another aspect, the STAs may not initiate a UL PPDU transmission during the time interval but the AP 110 may send a CTX or other message to the STAs to initiate the UL PPDU transmission.

In certain embodiments, a STA 120 enabled for UL-MU-MIMO (or UL-FDMA) may indicate to an AP 110 that it requests an UL-MU-MIMO TXOP (or UL-FDMA TXOP) because it has data pending for UL. In one aspect, the STA 120 may send a RTS or a PS-poll to request a UL PPDU TXOP. In another embodiment, the STA 120 may send any data frame, including a quality of service (QoS) null data frame, where the bits 8-15 of the QoS control field indicate a non-empty queue. In this embodiment the STA 120 may determine during the setup phase which data frames (e.g., RTS, PS-poll, QoS null, etc.) will trigger a UL PPDU transmission when the bits 8-15 of the QoS control field indicate a non-empty queue. In one embodiment, the RTS, PS-poll, or QoS null frames may include a 1 bit indication allowing or disallowing the AP 110 to respond with a trigger message 402. In another embodiment, the QoS null frame may include TX power information and a per TID queue information. The TX power information and per TID queue information may be inserted in the two bytes of the sequence control and QoS controls fields in a QoS null frame and the modified QoS null frame may be sent to the AP 110 to request a UL PPDU TXOP. In another embodiment, the STA 120 may send a RTX to request a UL PPDU TXOP.

In response to receiving an RTS, RTX, PS-poll or QoS null frame, or other trigger message as described above, an AP 110 may send a trigger message 402. In one embodiment, after the transmission of the trigger message 402 and the completion of the UL PPDU transmissions 410A-B, TXOP returns to the STAs 120A and 120B which can decide on how to use the remaining TXOP. In another embodiment, after the transmission of the trigger message 402 and the completion of the UL PPDU transmissions 410A and 410B, TXOP remains with the AP 110 and the AP 110 may use the remaining TXOP for additional UL PPDU transmissions by sending another trigger message 402 to either STAs 120A and 120B or to other STAs.

Figure 6:
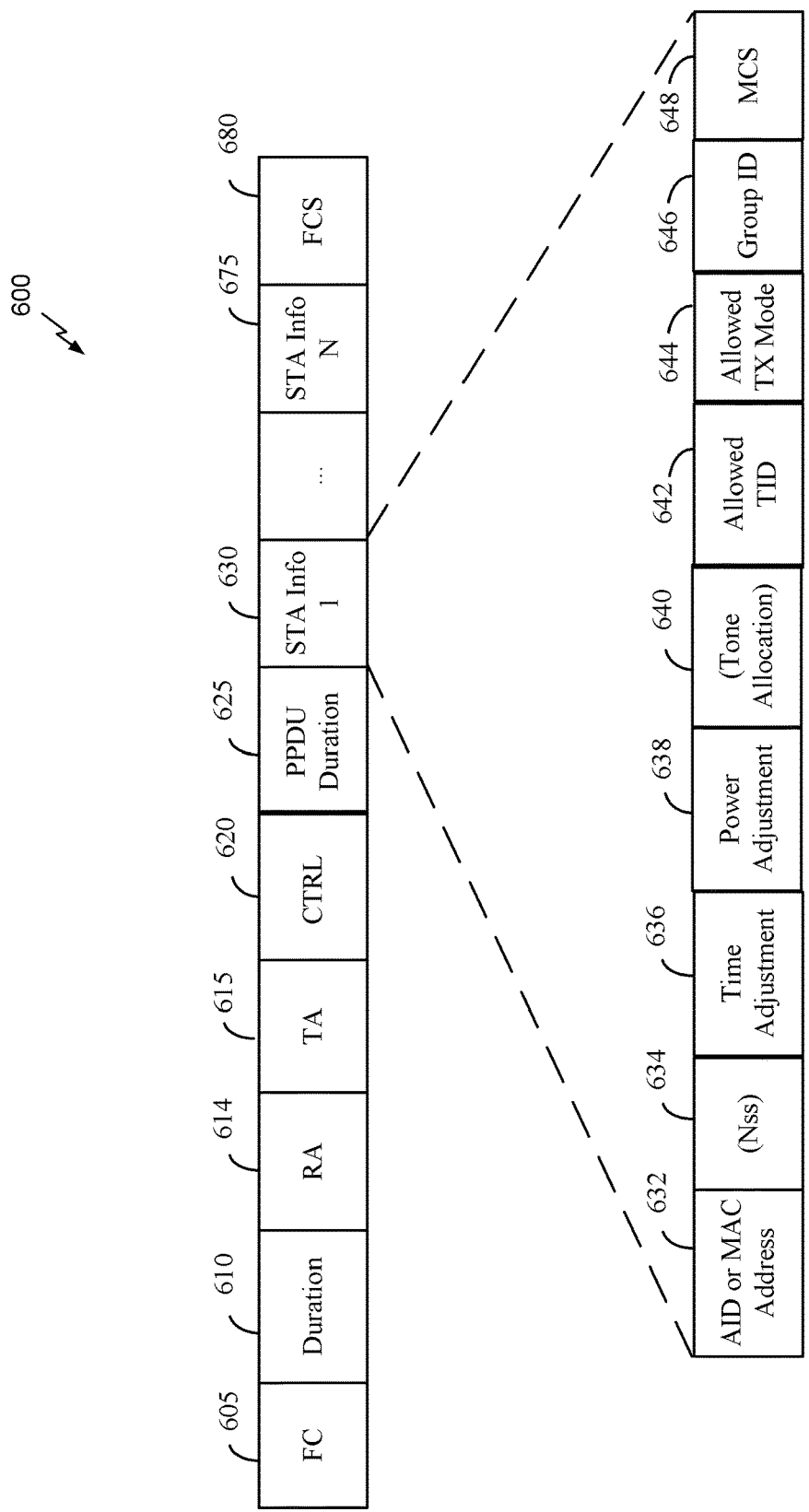
FIG. 6 shows a diagram of one embodiment of a trigger message.

As discussed above, the trigger message 402 may be used in a variety of communications. FIG. 6 is diagram of one embodiment of a trigger message. In this embodiment, the trigger message comprises a CTX message 600, which is a control frame that includes a frame control (FC) field 605, a duration field 610, a receiver address (RA) field 614, a transmitter address (TA) field 615, a control (CTRL) field 620, a PPDU duration field 625, a STA info field 630, and a frame check sequence (FCS) field 680. The FC field 605 can indicate a control subtype or an extension subtype. The duration field 610 can indicate to any receiver of the CTX message 600 to set the network allocation vector (NAV). In some embodiments the RA field 614 identifies a group of STAs through a multicast MAC address. The TA field 615 can indicate the transmitter address or a BSS identifier (BSSID). The CTRL field 620 is a generic field that may include information regarding the format of the remaining portion of the frame (e.g., the number of STA info fields and the presence or absence of any subfields within a STA info field), indications for rate adaptation for the STAs 120, indication of allowed TID, and indication that a clear to send (CTS) must be sent immediately following the CTX message 600. The CTRL field 620 may also indicate if the CTX message 600 is being used for UL MU-MIMO or for UL-FDMA or both, indicating whether a Nss or Tone allocation field is present in the STA Info field 630.

Alternatively, the indication of whether the CTX is for UL-MU-MIMO or UL-FDMA can be based on the value of the subtype. Note that UL-MU-MIMO and UL-FDMA operations can be jointly performed by specifying to a STA both the spatial streams to be used and the channel to be used, in which case both fields are present in the CTX; in this case, the Nss indication is referred to a specific tone allocation. The PPDU duration field 625 comprises an indication of the duration of the following UL-MU-MIMO PPDU that the STAs 120 are allowed to send. The STA Info field 630 contains information regarding a particular STA and may include a per-STA (per STA 120) set of information (see STA Info 1 630 and STA Info N 675). The STA Info field 630 may include an association identifier (AID) or MAC address field 632 which can identify a STA, a number of spatial streams field (Nss) 634 field which can indicate the number of spatial streams a STA may use (in an UL-MU-MIMO system), a Time Adjustment 636 field which can indicate a time that a STA should adjust its transmission compared to the reception of a trigger message (e.g., a CTX), a Power Adjustment 638 field which can indicate a power backoff a STA should take from a declared transmit power, a Tone Allocation 640 field which can indicate the tones or frequencies a STA may use (in a UL-FDMA system), an Allowed TID 642 field which can indicate the allowable TID, an Allowed TX Mode 644 field which can indicate the allowed TX modes, a group identifier 646 which can indicate the group to which the STA is assigned in accordance with the embodiments described herein, and a modulation and coding scheme (MCS) 648 field which can indicate the MCS the STA should use. A STA 120 receiving a CTX with a Allowed TID 642 indication may be allowed to transmit data only of that TID, data of the same or higher TID, data of the same or lower TID, any data, or only data of that TID first, then if no data is available, data of other TIDs. The FCS field 680 carries an FCS value used for error detection of the CTX message 600.

Figure 7:
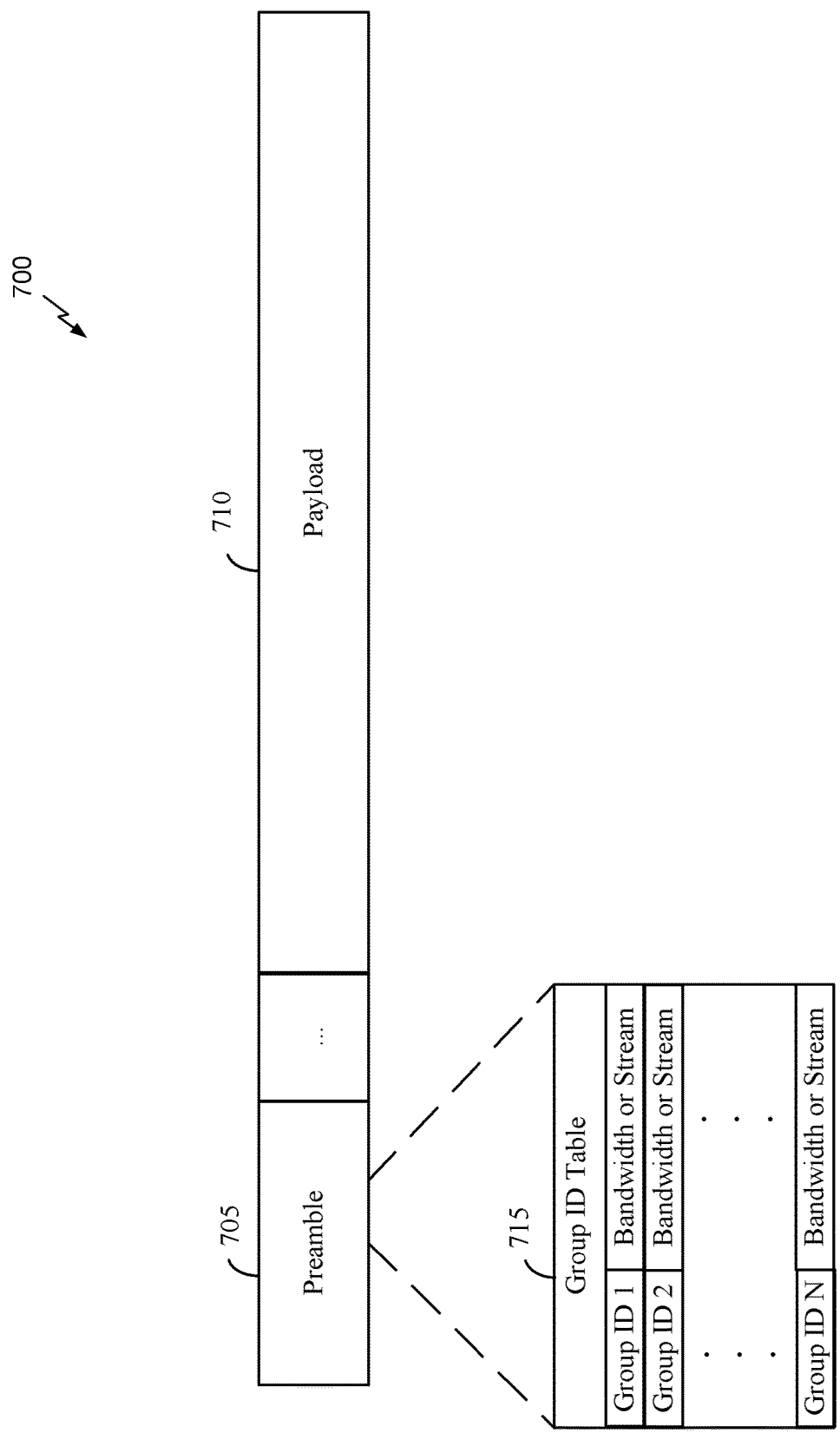
FIG. 7 shows diagram of one embodiment of a downlink PPDU transmission.

FIG. 7 shows diagram of one embodiment of a DL PPDU 700 communication. The DL PPDU 700 may be used in accordance with the exemplary embodiments discussed herein. DL PPDU 700 may comprise a preamble 705 and a payload 710. The preamble 705 may comprise a group identifier table 715. In the illustrated embodiment, the group identifier comprises a listing of group identifiers (1 through N), and an indication of the frequency bandwidth or spatial stream associated with each group identifier. In some embodiments, the payload 710 comprises data intended for a plurality of STAs. In one embodiment, payload 710 comprises acknowledgment of information previously sent by STAs and successfully received by the AP 110. In one embodiment, the acknowledgment comprises a block acknowledgment (BA). In one embodiment, the payload 710 comprises negative acknowledgment (NACK) sent to the STAs. In some aspects, payload 710 comprises maintenance data or control data for the STAs 120 or user devices. In various embodiments, DL PPDU is sent by AP 110 to a plurality of STAs 120 or user devices.

In other embodiments, the preamble may comprise a table comprising a list of STA identifiers instead of the group identifier table 715. This table could comprise a list of STA identifiers and the associated frequency bandwidth or spatial stream on which the STA is to receive a resource or data. In this embodiment, the trigger message (e.g., trigger message 402 of FIG. 4) would not need to comprise an indication of a group of STAs to receive a resource or data in a subsequent data transmission (e.g., DL PPDU transmission 470 of FIG. 4). In one embodiment, the STA identifier comprises a partial MAC address of the STA, or some other unique identifier. These embodiments may be particularly advantageous in small to medium sized wireless communication networks, and may minimize overhead compared with methods of keeping track of group identifiers in accordance with embodiments described herein.

Figure 8:
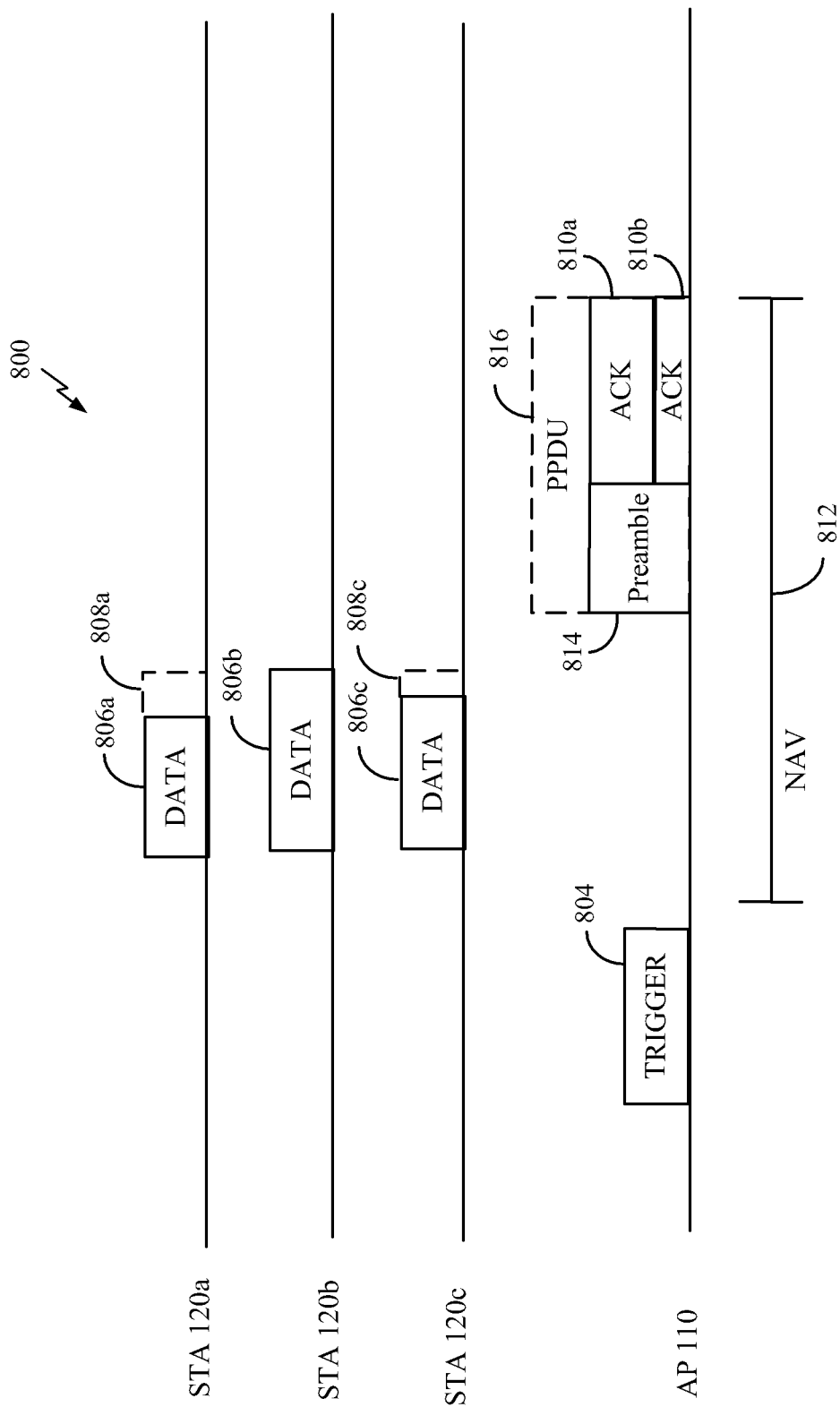
FIG. 8 is a message timing diagram of one embodiment of multi-user uplink and downlink communication.

FIG. 8 is a message timing diagram of one embodiment of multi-user uplink and downlink communication. Message exchange 800 shows communication of wireless messages between an AP 110 and three STAs 120a-c. Message exchange 800 can indicate that the AP 110 may transmit a trigger message 804. In some aspects, the trigger message 804 is transmitted to at least the STAs 120a-c. In some aspects, the trigger message 804 is broadcast or multicast. In some aspects, the trigger message 804 can indicate which STAs 120 are granted permission to transmit data to the AP 110 during a transmission opportunity. The starting time of the transmission opportunity and its duration may be indicated in the trigger message 804 in some aspects. For example, the trigger message 804 may indicate that the STAs 120a-c should set their network allocation vectors to be consistent with NAV 812. In some embodiments, the trigger message comprises a CTX message. In one embodiment, the trigger message 804 comprises information indicating a frequency bandwidth or spatial stream for each STA 120a-c to transmit an UL PPDU (e.g., data 806a-c) to the AP 110.

At a time indicated by the trigger message 804, the three STAs 120a-c transmit data 806a-c to the AP 110. The data 806a-c is transmitted at least partially concurrently during the transmission opportunity. In various aspects, the data 806a-c is transmitted via the frequency bandwidth or spatial stream indicated in the trigger message 804. The transmissions of data 806a-c may utilize uplink multi-user multiple inputs multiple outputs transmissions (UL-MU-MIMO) or uplink frequency division multiple access (UL-FDMA), or some other variation of FDMA. Referring to FIG. 8, in conjunction with FIG. 1, the transmission of data 806a-c may or may not have the same duration. For instance, data 806a is shown in FIG. 8 as being shorter in length than data 806b, as indicated by portion 808a, and data 806c is shown as being shorter than data 806b, as indicated by portion 808c. A preferred duration of the transmission of data 806a-c for STAs utilizing the UL-MU-MIMO (or UL-FDMA) feature may be indicated in the trigger message 804 or during the setup phase. To generate data of the required duration, a STA 120 may build a PLCP service data unit (PSDU) so that the length of the data 806a-c (e.g., a DL PPDU) matches the length indicated in the trigger message 804. In another aspect, a STAs 120a-c may adjust the level of data aggregation in a media access control (MAC) protocol data unit (A-MPDU) or the level of data aggregation in a MAC service data unit (A-MSDU) to approach the target length. In another aspect, a STA 120 may add end of file (EOF) padding delimiters to reach the target length. In another approach the padding or the EOF pad fields are added at the beginning of the A-MPDU. One of the benefits of having all the UL PPDU transmissions the same length is that the power level of the transmission will remain constant.

After the AP 110 receives the transmitted data 806a-c, AP 110 may transmit PPDU 816 to STAs 120a-c. The PPDU 816 may utilize downlink multi-user multiple input, multiple output transmissions (DL-MU-MIMO) or downlink frequency division multiple access (DL-FDMA), or some other variation of FDMA. The PPDU 816 may be formed in accordance with the DL PPDU 700 of FIG. 7. In FIG. 8, the PPDU is illustrated as comprising a shared preamble 814 and ACKs 810a and 810b. In one embodiment, ACKs 810a-b are BAs. ACKs 810a-b may be acknowledging the successful reception of information contained in data 806a-c. In accordance with one exemplary embodiment, ACKs 810a-b may be ACKs for a group of STAs. Specifically, ACK 810a may comprise a BA of information sent by a group of STAs comprising STA 120a and STA 120b, and ACK 810b may comprise a BA of information sent by STA 120c.

In some embodiments, the trigger message 804 may comprise an indication of a group of STAs, which may comprise a group identifier associated with the group of STAs. The trigger message 804 may comprise indications for all STA groups, or may instead only comprise indications for the group of STAs comprising the STA that is the intended recipient of the trigger message 804. The use of groups can provide for methods of allocating multi-user resources in MU-MIMO (or FDMA) systems. In some embodiments, the group identifier is determined by the AP 110 shortly before the transmission of the trigger message 804. In one embodiment, the AP assigns at least some of the STAs using the MU-MIMO (or FDMA) features to a plurality of groups. For example, in one embodiment, the AP 110 may assign ten STAs to five groups, each group comprising two STAs. These groups may be utilized by the STAs and the AP when transmitting messages intended for multiple STAs.

In one embodiment, the group identifiers are used during the transmission of the PPDU 816. As illustrated in FIG. 8, the PPDU 816 may comprise a shared preamble 814, which may comprise a listing of group identifiers and indications of a frequency bandwidth or spatial stream associated with each group or group identifier. In accordance with this embodiment, the AP 110 may send the same PPDU 816 to multiple STAs (e.g., STAs 120a-c), and each STA may look up its associated group identifier in the shared preamble 814 of the PPDU 816. If the STA finds its group identifier in the shared preamble 814 of the PPDU 816, it may then determine which frequency bandwidth or spatial stream is associated with the STA or the group of STAs, and may thereafter listen to the indicated frequency bandwidth or spatial stream in order to receive data intended for the STA or group of STAs. In the embodiment illustrated by FIG. 8, the data intended for the STA or group of STAs comprises a BA (e.g., ACK 810a-b). These ACKs 810a-b may be used to acknowledge data or information sent by the STA or group of STAs in an uplink PPDU (e.g., data 806a-c). In some embodiments, the data intended for the STA or group of STAs comprises management data or control data. In another embodiment, the PPDU 816 may not comprise the common preamble 814, and the AP 110 may instead send a plurality of parallel PPDUs.

Figure 9:
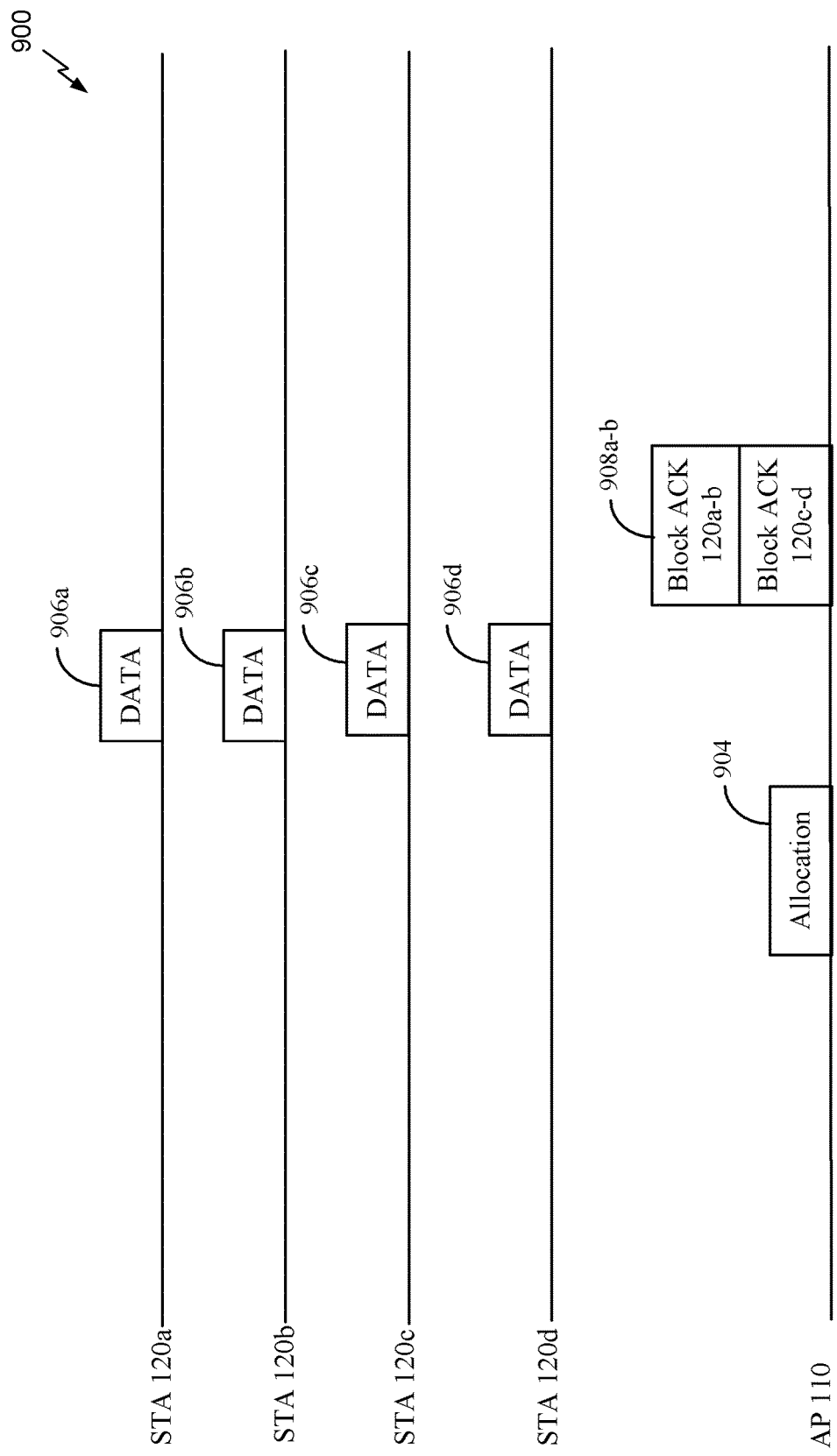
FIG. 9 is a message timing diagram of one embodiment of multi-user block acknowledgment communications.

FIG. 9 is a message timing diagram of one embodiment of multi-user BA communications. The exemplary message exchange 900 is performed by four STAs 120a-d and an AP 110. In the embodiment illustrated by FIG. 9, the AP 110 provides STAs 120a-d with an indication of a grouping of STAs in the allocation message 904. In some embodiments, the indication of the grouping comprises an indication of a frequency bandwidth or spatial stream for the group of STAs 120 to receive data intended for the STA or group of STAs. For instance, a first group of STAs may comprise STA 120a and STA 120b, and a second group of STAs may comprise STA 120c and STA 120d.

In accordance with this embodiment, the STA or group of STAs may listen to the indicated frequency bandwidth or spatial stream to receive data intended for the STA or group of STAs. In one embodiment, the data intended for the STA or group of STAs comprises a BA. This BA may be used to acknowledge data or information sent by the STA or group of STAs in the data 806a-c, or in some other communication sent by the STA or group of STAs. In some embodiments, the data intended for the STA or group of STAs comprises management data or control data.

One of skill in the art will appreciate that various numbers of STAs may be in communication with an AP 110, and therefore various numbers of groups may be utilized in accordance with the systems and methods described herein. The groups may each contain an equal, or approximately equal, number of STAs, or may contain groups that do not contain an equal number of STAs in each. For instance, in one embodiment, the AP 110 may utilize a predetermined number of groups of STAs. In some embodiments, the AP 110 may assign one STA to each of its available number of groups before assigning any additional STAs to another group. In other embodiments, the AP 110 may assign a specific number of STAs to a group before assigning any STAs to another one of its available groups. In one embodiment, the AP 110 may dynamically add or remove groups to/from the number available groups based on the size of the communications network (e.g., more STAs in communication with the AP 110).

In another embodiment the resource allocated for transmission to a group of STAs for a DL transmission may be implicitly derived from the allocation of the resources for the UL transmission. In one example the trigger frame may indicate an allocation of UL resources for each of a group of STAs, all resources for the STAs falling within a certain bandwidth (e.g. 20 Mhz); in this example, the certain bandwidth may be the common resource also allocated for the DL transmission to the group of STAs.

In another embodiment the resources for transmission of the group information (e.g. DL BAs) to one or more STA or groups of STAs are predefined (e.g. 20 MHz channels). The allocation of a resource to the one or more STA or groups of STAs may be implicitly derived from the STAs identifier, or from the allocation of the UL resources. In one example, the resources allocated for UL transmission to individual STAs are indexed, e.g. based on a predefined ordering. A STA will be associated with a certain DL group resource as a function of the index of the allocated UL resource to that STA.

Initially, each of the STAs 120*a*-*d* may transmit an acknowledgment policy message (not shown) to the AP 110. In some aspects, the acknowledgment policy is a request to transmit (RTX) message. The acknowledgment policy message may indicate how data transmitted by each of the STAs 120*a*-*d* respectively should be acknowledged by the AP 110. For example, in some aspects, each acknowledgment policy message may indicate whether the STA 120 requests an acknowledgment for each message, an immediate BA, or delayed BA.

In one exemplary embodiment, the AP 110 may transmit an allocation message 904 to STAs 120*a*-*d*. In some embodiments, the allocation message 904 may be a trigger message described herein, or a may be a CTX message in accordance with FIG. 6. In other aspects, the allocation message 904 may comprise some other existing frame format (e.g., a frame format utilized in 802.11, specifically 802.11ah), or may comprise a new frame format. In some aspects, one allocation message 904 will be transmitted to all four of the STAs 120*a*-*d*. In some other aspects, multiple allocation messages may be transmitted (not shown). The allocation message 904 may provide information regarding a start time and a duration of a transmission opportunity during which the STAs 120*a*-*d* are granted permission to transmit data. In some embodiments, the allocation message 904 may comprise an indication of a frequency bandwidth or spatial stream that STAs 120*a*-*d* may use to transmit data 906*a*-*d*.

In one embodiment, STAs 120*a*-*d* transmit data 906*a*-*d* to the AP 110 via the frequency bandwidth or spatial stream indicated in the allocation message 904. The data messages 906*a*-*d* are transmitted at least partially simultaneously. In some aspects, the data messages 906*a*-*d* may be transmitted using uplink multi-user MIMO and in some other aspects the data messages 906*a*-*d* may be transmitted using uplink FDMA. The transmission of data 906*a*-*d* may be in response to the reception of the allocation message 904, but in some embodiments the allocation message 904 may be otherwise be part of a maintenance or control process that allocates STAs to groups and does not trigger the transmission of data 906*a*-*d*.

In some aspects, the allocation message 904 may indicate to one or more STAs 120, a time at which they can expect an acknowledgement for data sent during the transmission opportunity. For example, a STA 120 may request regular acknowledgments in an acknowledgment policy message. In one exemplary embodiment, the allocation message indicates a frequency bandwidth or spatial stream on which the STA (e.g., STA 120*a*) or group of STAs (e.g., the group of STAs comprising STA 120*c* and 120*d*) may listen to in order to receive data intended for the STA or group of STAs. In one embodiment, the data intended for the STA or group of STAs comprises a BA. In the embodiment illustrated by FIG. 9, PPDUs 908*a*-*b* each comprise a BA. Specifically, PPDU 908*a* comprises a BA for the group of STAs comprising STA 120*a* and STA 120*b*, and PPDU 908*b* comprises a BA for the group of STAs comprising STA 120*c* and STA 120*d*. These BAs may be used to acknowledge data or information sent by the STA or group of STAs in the data 906*a*-*d*, or in some other communication sent by the STA or group of STAs. In some embodiments, the data intended for the STA or group of STAs (e.g., PPDUs 908*a*-*b*) comprises management data or control data. PPDUs 908*a*-*b* may be transmitted at least partially simultaneously. In some aspects, the PPDUs 908*a*-*b* may be transmitted using downlink multi-user MIMO or downlink FDMA. In other aspects, the PPDUs may be transmitted using legacy single user PPDUs multiplexed in frequency.

Figure 10:
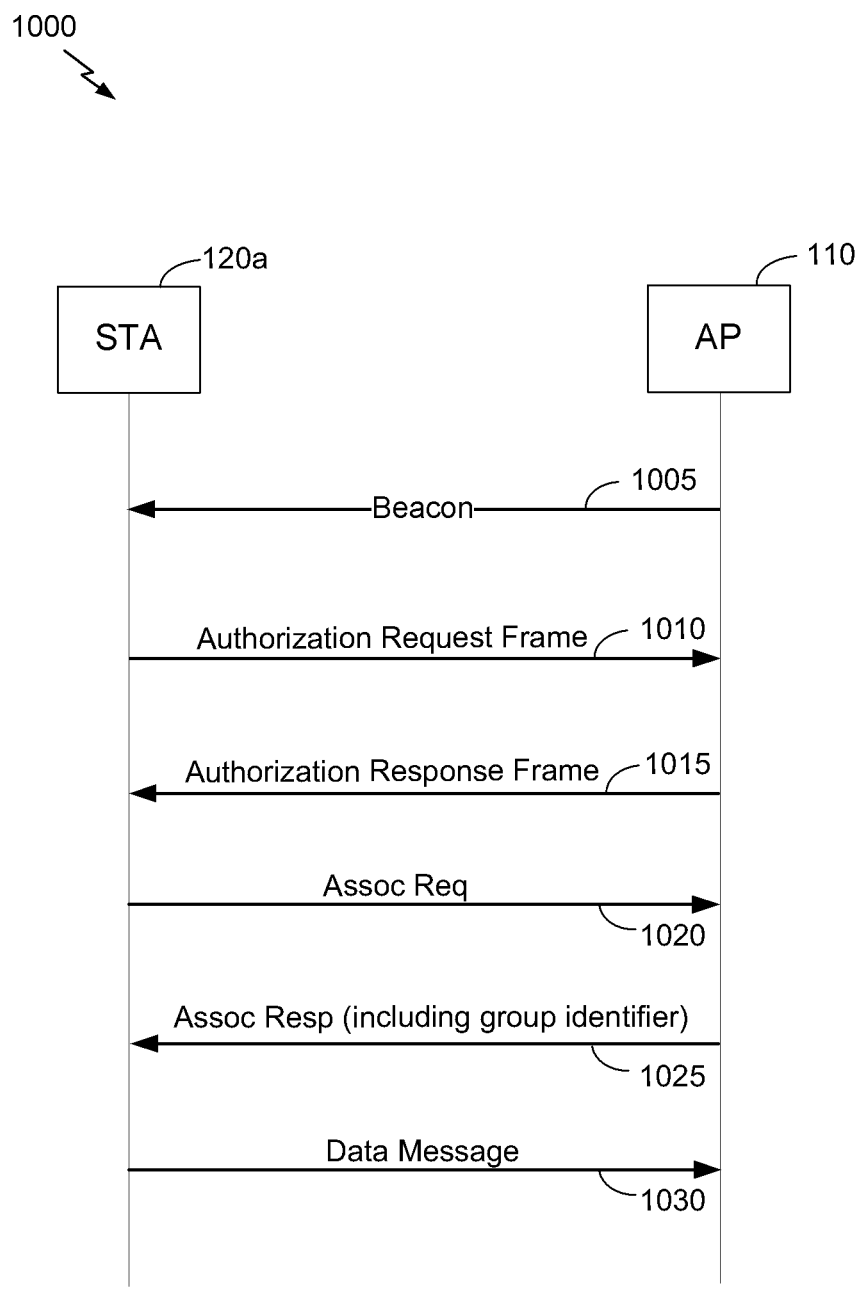
FIG. 10 shows a call flow diagram for discovery authorization and association communication exchange between a wireless station and an access point.

FIG. 10 shows a call flow diagram 1000 for discovery authorization and association communication exchange between a STA 120*a* and an AP 110. The call flow diagram 1000 includes several entities which may be associated with a wireless communication network. The call flow may be initiated when the AP 110 transmits a signal 1005. The signal 1005, as shown in FIG. 10 is a beacon signal. The signal 1005 may include information that a STA may use to associate with the wireless communication network. In one embodiment, the signal 1005 comprises a group identifier for a group of STAs 120 comprising STA 120*a*.

The STA 120*a* may receive the signal 1005. Based on the received signal 1005, the STA 120*a* may be configured to associate with the AP 110. The STA 120*a* may be configured to transmit a signal 1010 requesting authorization. The AP 110 may respond to the signal 1010 requesting authorization by transmitting an authorization response message 1015. The STA 120*a* may then request association with the wireless communication network to the AP 110 by transmitting a signal 1020. The signal 1020 may be an association request signal. In implementations utilizing LTE, the signal 1020 may be an Attach Request. The signal 1020 may include an indication of a request for a group identifier by the STA 120*a*.

In some implementations, the signal 1020 is transmitted via a level 2-MAC basis. This link layer signaling allows the association request to be submitted prior to full association and authentication with the network. In LTE or UMTS based systems, the signal 1020 may be transmitted via NAS (Non-Access Stratum). In such systems, the packet gateway may be configured to service the signal 1020. In HRPD or cdma1× based systems, the signal 1020 may be transmitted via PPP/Mobile-IP. In such systems, the home agent (HA) or packet state switching node (PDSN) may be configured to service the signal 1020.

The AP 110 may process the signal 1020 as part of the association procedures. As part of that signal processing, the AP 110 may determine a group identifier to assign to the STA 120a. The group identifiers may be determined based on a pool of group identifiers maintained by the AP 110. Alternatively, the AP 110 may determine the one or more interface identifiers by requesting interface identifiers from another entity, for example, the system controller 130 of FIG. 1.

The AP 110 may generate an association response signal 1025. The association response signal 1025 may indicate the group identifier. In some aspects, the group identifiers may be utilized in a DL PPDU similar to the embodiments described herein. Upon receiving the group identifier from the AP 110, the STA 120a may store the group identifier for use in later received transmission. The STA 120a may then send a data message 1030 utilizing the wireless communications network provided at least in part by the AP 110.

Figure 11:
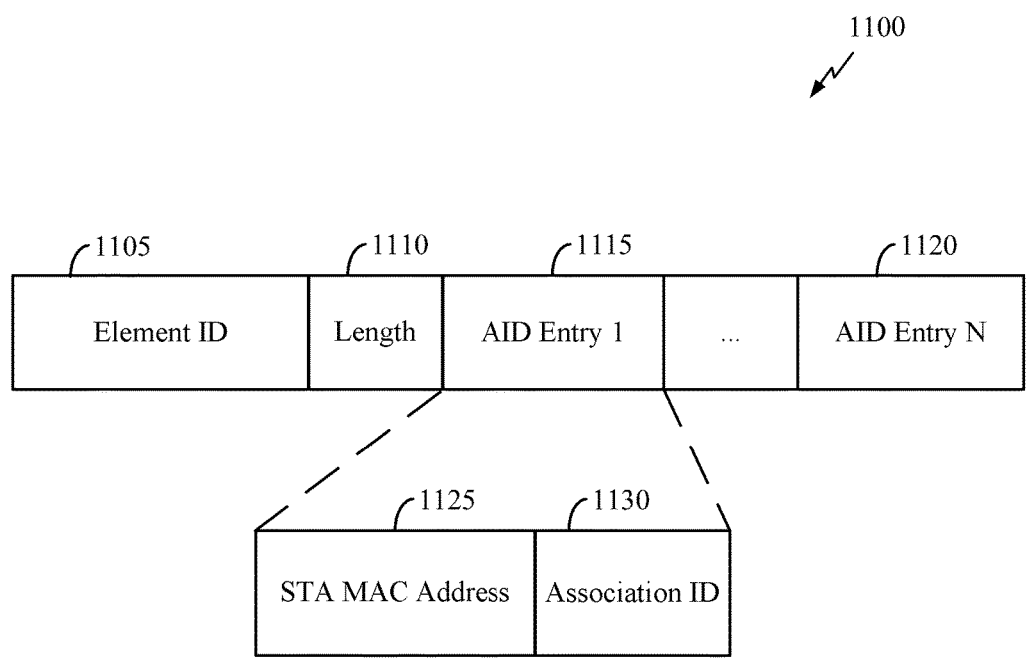
FIG. 11 shows diagram of one embodiment of an AID announcement.

FIG. 11 shows diagram of one embodiment of an AID announcement transmission 1100. In accordance with this embodiment, the group identifier, or the indication of the frequency bandwidth or spatial stream allocated for a group of STAs may be included in a delivery traffic indication message (DTIM) beacon. In one embodiment, the group identifier, or the indication of the frequency bandwidth or spatial stream allocated may only be valid for the DTIM interval. In some embodiments, an AID announcement transmission 1100 may comprise an element ID field 1105, a length field 1110, and an AID entry 1 field 1115 through AID entry N field 1120, similar to the AID announcement element format in current 802.11 standards (namely 802.11ah). In one embodiment, the AID entry 1 field may comprise a STA MAC Address field 1125 and an Association ID field 1130. In one embodiment, the association ID field 1130 comprises the group identifier or the indication of the frequency bandwidth or spatial stream allocated for the group of STAs. In accordance with this embodiment, STAs 120 or groups of STAs may utilize DL PPDU transmissions similar to various embodiments described herein.

Figure 12:
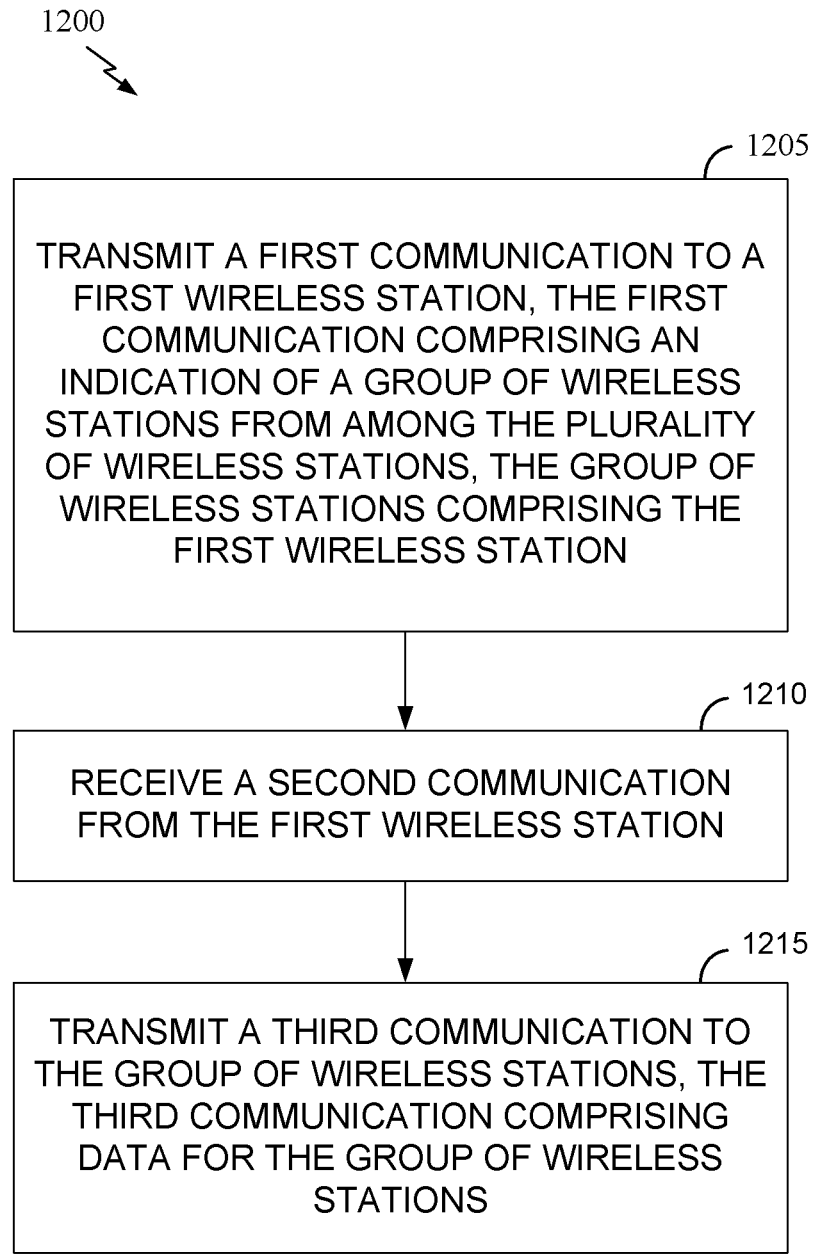
FIG. 12 is a flowchart of a method of communication with a plurality of wireless stations.

FIG. 12 is a flowchart of a method 1200 of communication with a plurality of wireless stations. The method 1200 may be performed, in some aspects, by one or more of the wireless device 302, an AP 110 or any of the STAs 120 discussed above. In some aspects, method 1200 may be utilized for allocating multi-user resources. In an embodiment, method 1200 may provide for the transmission of a plurality of acknowledgment messages to acknowledge groups of multi-user transmissions, at least partially in parallel or concurrently. By transmitting acknowledgment messages concurrently to groups of STAs, greater utilization of a wireless medium may be achieved. For example, in some aspects, method 1200 provides for the transmission of multiple acknowledgments to multiple groups of STAs by using downlink FDMA or downlink multi-user MIMO. In some aspects, this capability allows acknowledgments to occur synchronously with their respective data in communication networks comprising a larger number of STAs. Thus, a greater percentage of the wireless medium utilization can be used for the transmission of data messages. This contrasts with solution that might instead follow a multi-user uplink transmission with a period of serial acknowledgments for each of the multi-user uplink transmissions, or a solution that might instead transmit ACK or BA messages for each of the multiple STAs individually.

As part of method 1200, at block 1205, an AP 110, for example, transmits a first communication to a first wireless station, such as STA 120a of FIG. 1 for example. The first communication comprises an indication of a group of wireless stations (e.g., STAs 120a-c), and the group of STAs 120a-c comprises the first STA 120a. In some aspects, the indication of the group of wireless stations can be used for the reception of a later communication. In an embodiment, the group of STAs 120a-c comes from among the plurality of wireless stations communicating with the AP 110 (e.g., the STAs 120a-i of FIG. 1). In some aspects, the first communication is a trigger message. In another aspect, the first communication is an allocation message. In an embodiment, the first communication comprises a message transmitted during an association procedure between the first STA 120a and the AP 110, for example. In another embodiment, the first communication comprises a DTIM beacon, and the indication of the group of STAs 120a-c is valid for a DTIM interval.

Some aspects, method 1200 can include transmitting, by the AP 110 for example, one or more trigger message(s) to one or more STAs 120, as discussed above. In some aspects, the trigger messages indicate a time when a second communication may be transmitted to the AP 110, for example. In some aspects, the trigger messages comprise an indication of a first resource that is being assigned to the first STA 120a or the group of STAs 120a-c, for example, to use for transmission of a second communication. In an embodiment, this indication of the first resource comprises an indication of a frequency bandwidth or spatial stream for transmitting a second communication. In some aspects, the indication of the group of STAs in the trigger message comprises a group identifier associated with the group of STAs 120a-c receiving the first communication.

Other aspects of method 1200 may include transmitting one or more allocation messages or frames to one or more STAs as discussed above. For example, in some aspects, the allocation messages indicate a time when a second communication may be transmitted to the AP 110 for example. In some aspects, the indication of the first resource of the allocation message comprises an indication of a frequency bandwidth or spatial stream for transmitting a second communication. In another aspect, the indication of the group of STAs in the allocation message comprises an indication of a frequency bandwidth or spatial stream for the group of STAs 120a-c to receive the data.

As part of method 1200, at block 1210, the AP 110, for example, receives a second communication from the first STA 120a, for example. In various embodiments, the second communication comprises one or more packets of information for which BA is requested. In some aspects, the second communication is received via uplink multi-user MIMO (UL-MU-MIMO). In another aspect, the second communication is received via uplink frequency division multiple access (UL-FDMA). In some aspects, other communications from other STAs 120 may also be received by the AP 110, at least partially concurrently with the second communication, or as part of the second communication. For example, these other communications may also be part of a UL-FDMA or UL-MU-MIMO transmission.

As part of method 1200, at block 1215, a third communication is transmitted by the AP 110, for example, to the group of STAs 120*a-c*, for example. In some aspects, the third communication comprises data intended for the group of STAs 120*a-c*, for example. In some aspects, the third communication is received via downlink multi-user MIMO (DL-MU-MIMO), while in other aspects, the third communication is received via downlink frequency division multiple access (DL-FDMA). In some aspects, the third communication further comprises a preamble. In an embodiment, the preamble comprises an indication of a resource for the group of STAs 120*a-c* to receive the data. For example, the preamble may comprise an indication of a frequency bandwidth or spatial stream associated with the group identifier (which may be indicated in the first communication) for receiving the data. In some aspects, method 1200 further comprises transmitting the data via the frequency bandwidth or spatial stream indicated in the preamble of the third communication.

In some aspects of method 1200, the data comprises a BA for the group of STAs 120*a-c*, for example. In some aspects, the BA is for packets or other information received by the AP 110 in the second communication. In an embodiment, the BA acknowledges packets or information received in a communication other than the second communication.

In certain aspects, the first communication further comprises an indication of a frequency bandwidth or spatial stream for the first STA 120 to transmit the second communication, and the second communication comprises at least a portion of an UL transmission from at least a portion of the plurality of STAs 120*a-i*. In accordance with these aspects, the UL transmission can contain a request for BA from the AP 110. In another embodiment, the indication of the group of wireless stations comprises a group identifier associated with the group of STAs 120*a-c*, and the third communication comprises at least a portion of a BA of the second communication.

In some aspects, the data may additionally or alternatively comprise control data or management data for the group of STAs 120*a-c*, for example.

In some embodiments, FDMA may be utilized. For example, in an aspect, the first communication comprises an indication of a frequency bandwidth or spatial stream for the group of STAs 120*a-c*, for example, to receive the third communication, and the third communication comprises a PPDU transmitted in parallel with other PPDUs. In another aspects, the first communication may not comprise the indication of the group of wireless stations, and instead may include an indication of a frequency bandwidth or spatial stream for an individual STA 120*a*, for example, to receive the third communication, wherein the third communication comprises a PPDU transmitted in parallel with other PPDUs.

In some aspects that use DL-FMDA to transmit the data intended for the group of STAs 120*a-c*, for example, the third communication is transmitted over a frequency band over which the first communication was sent, or the frequency band is at least based on the frequency band over which the first communication was sent. Similarly, in some aspects, the second communication may be received over the same frequency band over which the first communication was sent, or at least a frequency band that is based on the frequency band of the first communication.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a wireless station and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless station and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method of wireless communication with a plurality of wireless stations, the method comprising:
   transmitting, by an access point, a first communication to at least a first wireless station, the first communication indicating that at least a first group of a plurality of groups of wireless stations from among the plurality of wireless stations will receive a third communication, wherein the first wireless station is included in the first group of wireless stations and wherein the first group of wireless stations includes more than one wireless station;
   receiving, by the access point, a second communication including upload data from the first group of wireless stations in response to the transmission of the first communication; and
   in response to receiving the second communication from the first group of wireless stations, transmitting, by the access point, the third communication to at least the first group of wireless stations, the third communication comprising data for the first group of wireless stations, wherein the third communication acknowledges the upload data from the first group of wireless stations.

2. The method of claim 1, wherein the first communication further comprises an indication of a frequency bandwidth or spatial stream for the first wireless station to transmit the second communication, and wherein the second communication comprises at least a portion of an uplink transmission from the plurality of wireless stations, the uplink transmission requesting a block acknowledgment.

3. The method of claim 1, wherein the indication of the plurality of groups of wireless stations comprises a group identifier associated with the first group of wireless stations, and wherein the data comprises a block acknowledgment of at least a portion of the second communication.

4. The method of claim 1, wherein the third communication further comprises a preamble, the preamble comprising an indication of a resource for the first group of wireless stations to receive the data.

5. The method of claim 1, wherein the first communication further comprises an indication of a frequency bandwidth or spatial stream for the first group of wireless stations to receive the third communication, and wherein the third communication comprises a physical layer convergence protocol (PLCP) protocol data unit (PPDU) transmitted in parallel with other PPDUs.

6. The method of claim 1, wherein the data comprises at least one of:
   a block acknowledgment for the first group of wireless stations;
   control data for the first group of wireless stations; and
   management data for the first group of wireless stations.

7. The method of claim 1, wherein the first communication is a trigger frame or clear to transmit message, and wherein the second communication comprises an uplink frequency division multiple access (UL FDMA) communication or an uplink multi-user multiple inputs multiple outputs (UL MU-MIMO) communication.

8. The method of claim 1, wherein the first communication comprises a message transmitted during an association procedure between the first wireless station and the access point.

9. The method of claim 1, wherein the first communication comprises a delivery traffic indication message (DTIM) beacon, and wherein the indication of the plurality of groups of wireless stations is valid for a DTIM interval.

10. An access point for wireless communication with a plurality of wireless stations, the access point comprising:
    a processor configured to generate a first communication indicating that at least a first group of a plurality of groups of wireless stations from among the plurality of wireless stations will receive a third communication, wherein the first wireless station is included in the first group of wireless stations, and wherein the first group of wireless stations includes more than one wireless station;
    a transmitter configured to transmit the first communication to at least the first wireless station; and
    a receiver configured to receive a second communication including upload data from the first group of wireless stations in response to the transmission of the first communication;
    wherein the processor is further configured to generate a third communication comprising data for the first group of wireless stations, and
    wherein the transmitter is further configured to transmit, in response to receiving the second communication from the first group of wireless stations, the third communication to at least the first group of wireless stations, wherein the third communication acknowledges the upload data from the first group of wireless stations.

11. The access point of claim 10, wherein the first communication further comprises an indication of a frequency bandwidth or spatial stream for the first wireless station to transmit the second communication, and wherein the second communication comprises at least a portion of an uplink transmission from the plurality of wireless stations, the uplink transmission requesting block acknowledgment.

12. The access point of claim 10, wherein the indication of the plurality of groups of wireless stations comprises a group identifier associated with the first group of wireless stations, and wherein the data comprises a block acknowledgment of at least a portion of the second communication.

13. The access point of claim 10, wherein the third communication further comprises a preamble, the preamble comprising an indication of a resource for the first group of wireless stations to receive the data.

14. The access point of claim 10, wherein the first communication further comprises an indication of a frequency bandwidth or spatial stream for the first group of wireless stations to receive the third communication, and wherein the third communication comprises a physical layer convergence protocol (PLCP) protocol data unit (PPDU) transmitted in parallel with other PPDUs.

15. The access point of claim 10, wherein the data comprises at least one of:
a block acknowledgment for the first group of wireless stations;
control data for the first group of wireless stations; and
management data for the first group of wireless stations.

16. The access point of claim 10, wherein the first communication is a trigger frame or clear to transmit message, and wherein the second communication comprises an uplink frequency division multiple access (FDMA) communication or an uplink multi-user multiple inputs multiple outputs (MU-MIMO) communication.

17. The access point of claim 10, wherein the first communication comprises a message transmitted during an association procedure between the first wireless station and the access point.

18. The access point of claim 10, wherein the first communication comprises a delivery traffic indication message (DTIM) beacon, and wherein the indication of the plurality of groups of wireless stations is valid for a DTIM interval.

19. A non-transitory computer readable medium storing instructions that when executed cause a processor to perform a method of wireless communication with a plurality of wireless stations, the method comprising:
transmitting, by an access point, a first communication to a first wireless station, the first communication comprising an indication of a plurality of groups of stations from among the plurality of wireless stations, will receive a third communication, wherein the first wireless station is included in the first group of wireless stations, and wherein the first group of wireless stations includes more than one wireless station;
receiving, by the access point, a second communication including upload data from the first group of wireless stations in response to the transmission of the first communication; and
in response to receiving the second communication from the first group of wireless stations, transmitting, by the access point, the third communication to at least the first group of wireless stations, the third communication comprising data for the first group of wireless stations, wherein the third communication acknowledges the upload data from the first group of wireless stations.

20. An access point for communication with a plurality of wireless stations, the access point comprising:
means for generating a first communication indicating that at least a first group of a plurality of groups of wireless stations from among the plurality of wireless stations, will receive a third communication, wherein the first wireless station is included in the first group of wireless stations, and wherein the first group of wireless stations includes more than one wireless station;
means for transmitting the first communication to at least the first wireless station;
means for receiving a second communication including upload data from the first group of wireless stations in response to the transmission of the first communication;
means for generating a third communication comprising data for the first group of wireless stations; and
means for transmitting, in response to receiving the second communication from the first group of wireless stations, the third communication to at least the first wherein the third communication acknowledges the upload data from the first group of wireless stations.

* * * * *